S. LARSON.
Nut-Lock.
No. 224,448. Patented Feb. 10, 1880.
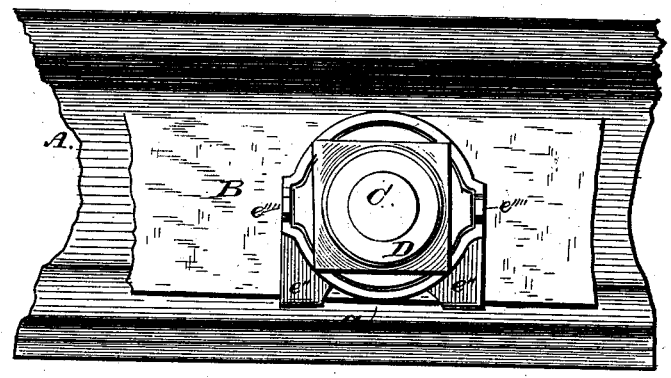
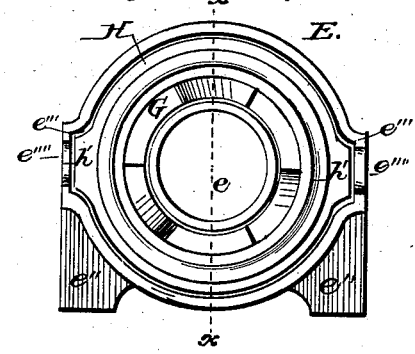
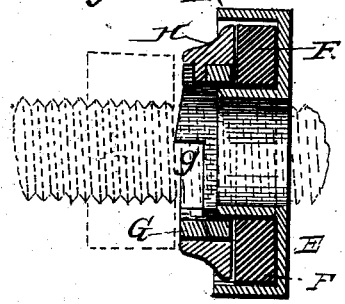
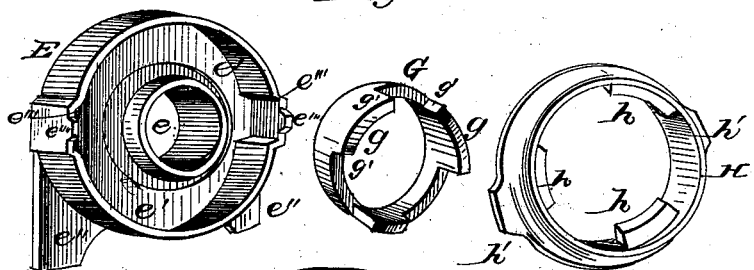
Witnesses
Fred G. Dieterich
B. L. Dieterich
Inventor:
Swan Larson
W. B. Richards
Attorney

UNITED STATES PATENT OFFICE.

SWAN LARSON, OF MONMOUTH, ILLINOIS.

NUT-LOCK.

SPECIFICATION forming part of Letters Patent No. 224,448, dated February 10, 1880.

Application filed December 6, 1879.

*To all whom it may concern:*

Be it known that I, SWAN LARSON, of Monmouth, in the county of Warren and State of Illinois, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a side elevation of a railway-rail and fish-plate, showing my invention as applied thereto. Fig. 2 is a front elevation of the nut-lock alone. Fig. 3 is a sectional view in the line $x\,x$ in Fig. 2. Fig. 4 is a perspective view, showing the parts of the nut-lock separately.

My invention relates to certain new and useful improvements in the class of nut-locks employing a cup-shaped washer containing a spring and a follower; and it consists in constructions and combinations hereinafter described, and set forth in the claims hereto annexed.

Referring to the drawings by letters, A represents a portion of a railway-rail; B, a fish-plate; C, a bolt, and D a nut for securing the fish-plate to the rail.

E is the base-plate of my nut-lock, and has a central hole, $e$, through which the bolt C passes; an annular groove, $e'$, in which a yielding ring, F, of rubber or other suitable material, is seated; lugs $e''$, which rest against the bottom flange, $a$, of the rail A, to prevent the base E from turning on the bolt C; and recesses $e'''$ and lugs $e''''$, for purposes hereinafter described.

G is a ring seated on the rubber F, as shown in the drawings, and has cam-shaped projections $g$ extending outwardly from its outer side. For use on a bolt with a right-hand screw-thread, the upper faces of the cams $g$ are inclined as shown in the drawings, and have sharp corners or edges $g'$, and for use with a bolt having a left-hand thread the upper faces of the cams $g$ may be inclined in an opposite direction to that shown in the drawings.

H is a ring resting on the rubber F, between the ring G and the outer flange, $E'$, of the base-plate E. The ring H has inwardly-projecting lugs $h$, which rest between the cams $g$ and prevent the ring G from turning, and is itself prevented from turning by lugs $h'$, which rest in recesses $e'''$ in the plate E.

The lugs $e''''$ may be turned down upon the ring H, to secure it in place, and thereby hold the ring G and rubber F in place in the base-plate E, so that the device is in convenient shape to apply on a bolt.

As the nut D is screwed down on the bolt its inner face will press upon the cams $g$ and force the ring G down upon the rubber spring F, and the resiliency of the spring F will force the nut outward, and thereby tend to prevent it being jarred loose on the bolt. The sharp corners $g'$ of the cams $g$ will cut into the adjacent face of the nut, and thereby also aid in locking the nut. The cams $g$ project slightly beyond the ring H, as shown at Fig. 3 of the drawings, so as to receive the greatest pressure of the nut, and so that when forced inward by the nut, it (the nut) may also press upon the ring H, which also rests upon the yielding spring F and is forced toward the nut thereby.

The lugs $e''$ on the base-plate E, or other equivalent devices, may be used to hold the nut-lock from turning in other situations than for railway fish-plates.

What I claim as new, and desire to secure by Letters Patent, is—

1. In a nut-lock, the combination, with a base-plate, E, having a central hole, $e$, and an annular groove, $e'$, containing a spring, F, and the holding-ring H, of the ring G, substantially as and for the purpose herein shown and described.

2. In a nut-lock, the combination, with a base-plate, E, having a central hole, $e$, and an annular groove, $e'$, containing a spring, F, of the ring G, having cams $g$, and the ring H, having lugs $h$, for holding the ring G in place, substantially in the manner herein shown and described.

In testimony that I claim the foregoing as my own I affix my signature in presence of two witnesses.

SWAN LARSON.

Witnesses:
 A. S. YOUNGQVIST,
 LARS LARSSON.